(12) United States Patent
Jo et al.

(10) Patent No.: US 12,373,344 B2
(45) Date of Patent: Jul. 29, 2025

(54) CONTROLLER AND METHOD OF OPERATING THE SAME

(71) Applicant: SK hynix Inc., Gyeonggi-do (KR)

(72) Inventors: Myung Jin Jo, Gyeonggi-do (KR); Ie Ryung Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 185 days.

(21) Appl. No.: 17/983,613

(22) Filed: Nov. 9, 2022

(65) Prior Publication Data
US 2023/0385194 A1   Nov. 30, 2023

(30) Foreign Application Priority Data
May 27, 2022   (KR) ................ 10-2022-0065544

(51) Int. Cl.
G06F 3/06 (2006.01)
G06F 12/0802 (2016.01)

(52) U.S. Cl.
CPC .. *G06F 12/0802* (2013.01); *G06F 2212/1021* (2013.01)

(58) Field of Classification Search
CPC ............. G06F 12/0802; G06F 12/0875; G06F 2212/1021
See application file for complete search history.

(56) References Cited

U.S. PATENT DOCUMENTS

2021/0294522 A1*  9/2021  Ish .................. G06F 3/0604

FOREIGN PATENT DOCUMENTS

| KR | 10-2017-0092430 A | 8/2017 |
| KR | 10-2020-0082323 A | 7/2020 |

* cited by examiner

*Primary Examiner* — Yong J Choe
(74) *Attorney, Agent, or Firm* — IP & T GROUP LLP

(57) ABSTRACT

A controller controls an operation of a semiconductor memory device based on a request received from a host. The controller includes a host interface, a first function block, a second function block, and an internal command cache. The host interface generates a first internal command in response to the request. The first function block generates a second internal command in response to the first internal command. The second function block operates in response to the second internal command. The internal command cache caches at least one internal command corresponding to a reference internal command.

9 Claims, 12 Drawing Sheets

| No. | REFERENCE | ICMD SET | | |
|---|---|---|---|---|
| 1 | ICMD1 | ICMD2 | ICMD3 | – |
| 2 | ICMD4 | ICMD5 | – | – |
| 3 | ICMD6 | ICMD7 | ICMD8 | ICMD9 |
| ⋮ | ⋮ | ⋮ | ⋮ | ⋮ |
| k | ICMDk | ICMDx | ICMDy | ICMDz |

| No. | REFERENCE | ICMD SET | | |
|---|---|---|---|---|
| 1 | RQ1 | ICMD1 | ICMD2 | ICMD3 |
| 2 | RQ2 | ICMD4 | ICMD5 | – |
| 3 | RQ3 | ICMD6 | ICMD7 | ICMD8 |
| ⋮ | ⋮ | ⋮ | ⋮ | ⋮ |
| k | RQk | ICMDp | ICMDq | ICMDr |

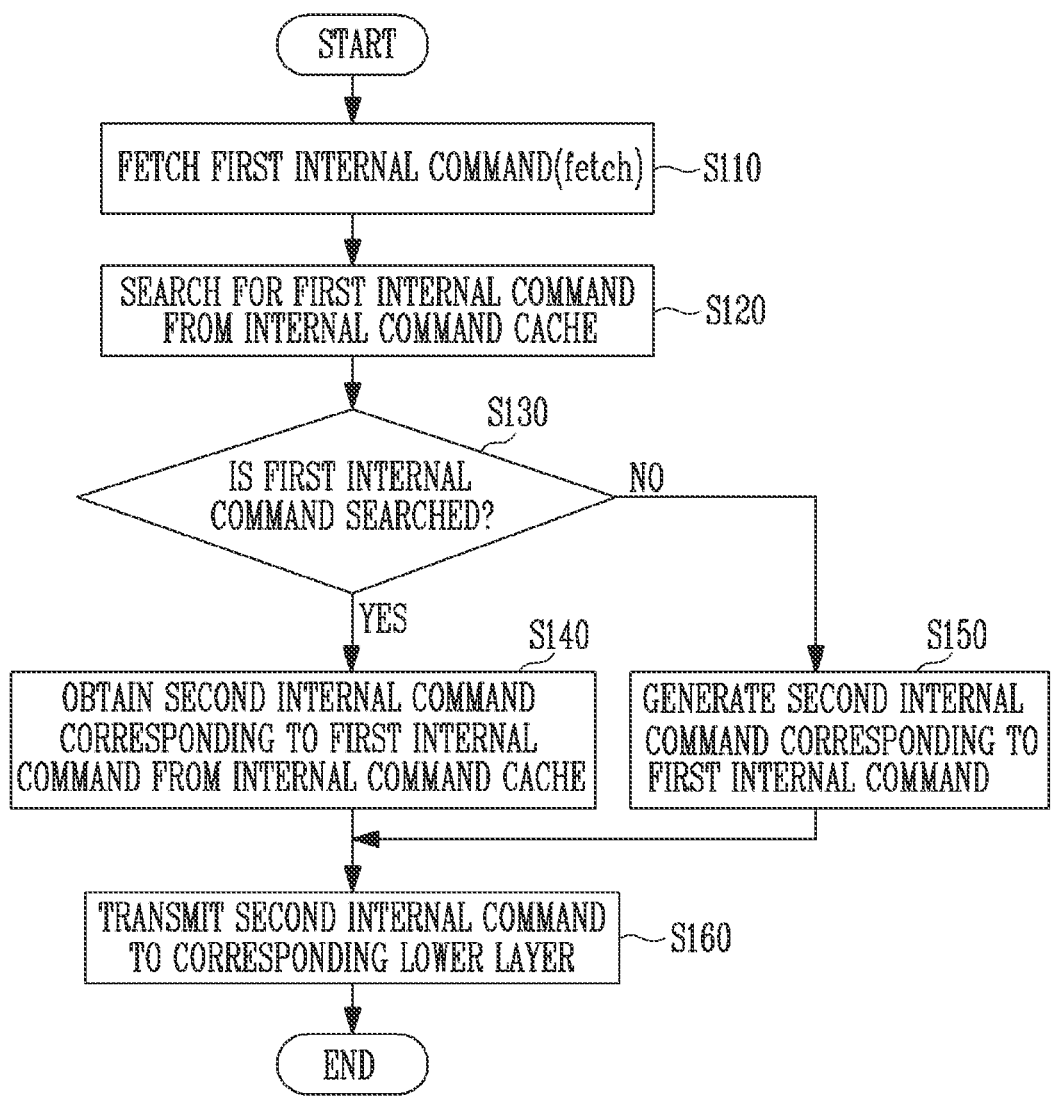

CONTROLLER AND METHOD OF OPERATING THE SAME

CROSS-REFERENCE TO RELATED APPLICATION

The present application claims priority under 35 U.S.C. § 119(a) to Korean patent application number 10-2022-0065544, filed on May 27, 2022, the entire disclosure of which is incorporated herein by reference.

BACKGROUND

Field of Invention

The present disclosure relates to an electronic device, and more particularly, to a controller controlling a semiconductor memory device and a method of operating the controller.

Description of Related Art

A semiconductor memory device may be formed in a two-dimensional structure in which strings are horizontally arranged on a semiconductor substrate, or in a three-dimensional structure in which the strings are vertically stacked on the semiconductor substrate. A three-dimensional semiconductor memory device is a memory device designed in order to resolve a limit of an integration degree of a two-dimensional semiconductor memory device, and may include a plurality of memory cells that are vertically stacked on a semiconductor substrate.

A controller may control an operation of the semiconductor memory device. Specifically, in response to a request received from a host, the controller controls the semiconductor memory device to perform an operation corresponding to the request by transmitting a command to the semiconductor memory device.

SUMMARY

An embodiment of the present disclosure provides a controller with improved speed and a method of operating the same.

According to an embodiment of the present disclosure, a controller controls an operation of a semiconductor memory device based on a request received from a host. The controller includes a host interface, a first function block, a second function block, and an internal command cache. The host interface generates a first internal command in response to the request. The first function block generates a second internal command in response to the first internal command. The second function block operates in response to the second internal command. The internal command cache caches at least one internal command corresponding to a reference internal command.

According to another embodiment of the present disclosure, a controller controls an operation of a semiconductor memory device based on a request received from a host. The controller includes a host interface, a first function block, and an internal command cache. The host interface generates a first internal command in response to the request. The first function block generates a second internal command in response to the first internal command. The internal command cache caches at least one internal command corresponding to a reference request.

According to still another embodiment of the present disclosure, an operation of a semiconductor memory device is controlled based on a request received from a host, by a method of operating a controller. The method includes fetching a first internal command generated in response to the request, determining whether a second internal command corresponding to the first internal command is stored in an internal command cache, and transmitting the second internal command to a lower layer of the controller based on a result of the determining.

According to still another embodiment of the present disclosure, an operation of a semiconductor memory device is controlled based on a request received from a host, by a method of operating a controller. The method includes fetching the request, determining whether an internal command corresponding to the request is stored in an internal command cache, and transmitting the internal command corresponding to the request to a lower layer of the controller based on a result of the determining.

According to still another embodiment of the present disclosure, an operating method of a controller is provided. The operating method includes caching a direction and a corresponding first command, controlling, when a provided direction is the same as the cached direction, the memory device to operate in response to the first command, and generating, when the provided direction is different from the cached direction, a second command to control a memory device to operate in response to the second command, which corresponds to the provided direction. The direction is an internal command or an external request.

The present technology may provide a controller with improved speed and a method of operating the same.

BRIEF DESCRIPTION OF THE DRAWINGS

FIGS. 15A and 15B are diagrams illustrating a configuration of an internal command storage shown in FIGS. 9 and 13, respectively, according to an embodiment of the present disclosure.

FIGS. 16A and 16B are flowcharts illustrating a method of operating a controller according to embodiments of the present disclosure.

DETAILED DESCRIPTION

Specific structural or functional descriptions of embodiments according to the concept which are disclosed in the present specification are illustrated only to describe the embodiments according to the concept of the present disclosure, and the embodiments according to the concept of the present disclosure may be implemented in various forms and should not be construed as being limited to the embodiments described in the present specification.

Figure 1:
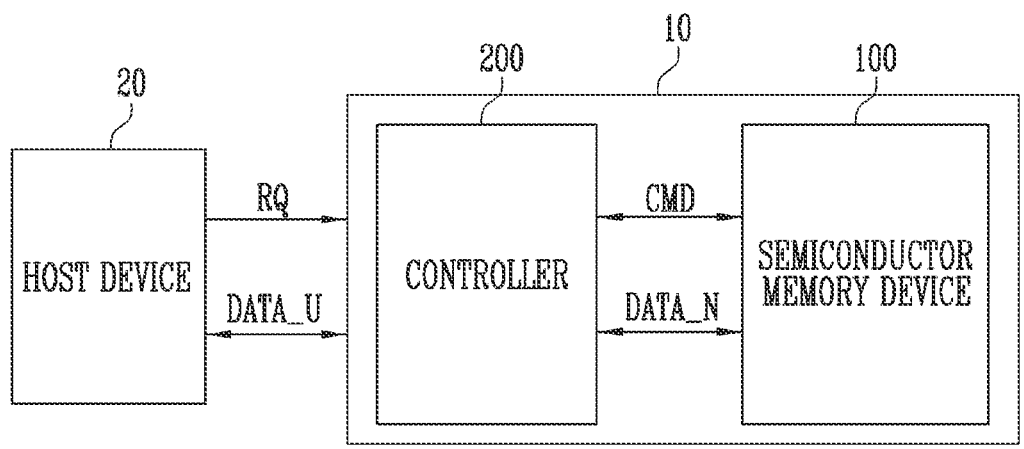
FIG. 1 is a block diagram illustrating a storage device and a host device according to an embodiment of the present disclosure.

FIG. 1 is a block diagram illustrating a storage device and a host device according to an embodiment of the present disclosure.

Referring to FIG. 1, the storage device 10 includes a semiconductor memory device 100 and a controller 200. In addition, the storage device 10 communicates with the host device 20. The controller 200 controls an overall operation of the semiconductor memory device 100. In addition, the controller 200 controls the operation of the semiconductor memory device 100 based on an operation request received from the host device 20.

The semiconductor memory device 100 operates in response to control of the controller 200. The semiconductor memory device 100 includes a memory cell array having a plurality of memory blocks. In an embodiment, the semiconductor memory device 100 may be a flash memory device.

The controller 200 may exchange user data DATA_U based on the request RQ from the host device 20. Specifically, the controller 200 may receive a write request, a read request, a trim request, or the like of the host device 20, and control the semiconductor memory device 100 based on the received requests. More specifically, the controller 200 may generate commands CMD for controlling the operation of the semiconductor memory device 100 and transmit the commands CMD to the semiconductor memory device 100. The controller 200 may exchange data DATA_N with the semiconductor memory device 100.

The semiconductor memory device 100 is configured to receive a command and an address from the controller 200 and access an area selected by the address in the memory cell array. That is, the semiconductor memory device 100 performs an internal operation corresponding to the command with respect to the area selected by the address.

For example, the semiconductor memory device 100 may perform a program operation, a read operation, and an erase operation. During the program operation, the semiconductor memory device 100 may program data in the area selected by the address. During the read operation, the semiconductor memory device 100 may read data from the area selected by the address. During the erase operation, the semiconductor memory device 100 may erase data stored in the area selected by the address.

Figure 2:
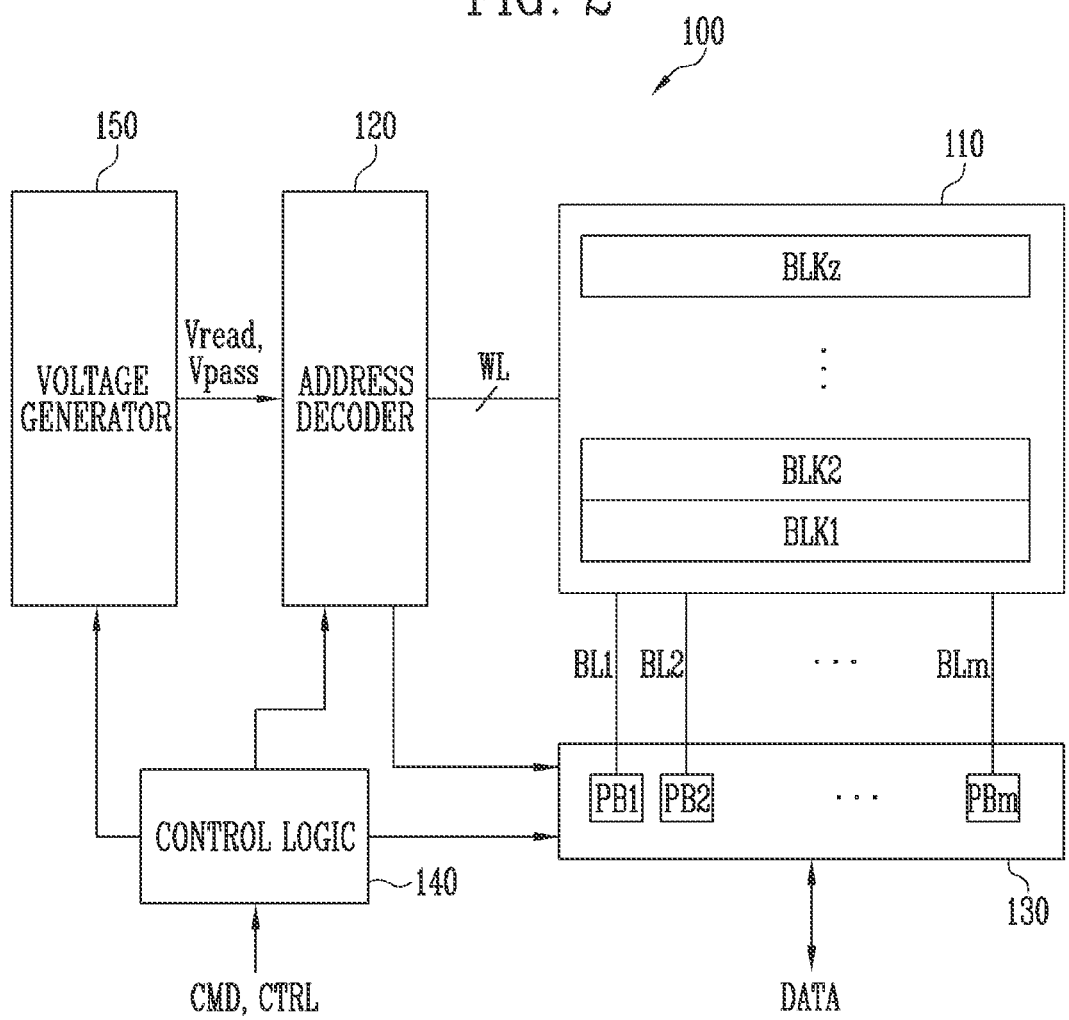
FIG. 2 is a block diagram illustrating a semiconductor memory device of FIG. 1 according to an embodiment of the present disclosure.

FIG. 2 is a block diagram illustrating the semiconductor memory device of FIG. 1 according to an embodiment of the present disclosure.

Referring to FIG. 2, the semiconductor memory device 100 includes a memory cell array 110, an address decoder 120, a read and write circuit 130, a control logic 140, and a voltage generator 150.

The memory cell array 110 includes a plurality of memory blocks BLK1 to BLKz. The plurality of memory blocks BLK1 to BLKz are connected to the address decoder 120 through word lines WL. The plurality of memory blocks BLK1 to BLKz are connected to the read and write circuit 130 through bit lines BL1 to BLm. Each of the plurality of memory blocks BLK1 to BLKz includes a plurality of memory cells. In an embodiment, the plurality of memory cells are non-volatile memory cells, and may be configured of non-volatile memory cells having a vertical channel structure. The memory cell array 110 may be configured as a memory cell array of a two-dimensional structure. According to an embodiment, the memory cell array 110 may be configured as a memory cell array of a three-dimensional structure. Each of the plurality of memory cells included in the memory cell array may store at least one bit of data. In an embodiment, each of the plurality of memory cells included in the memory cell array 110 may be a single-level cell (SLC) storing one bit of data. In another embodiment, each of the plurality of memory cells included in the memory cell array 110 may be a multi-level cell (MLC) storing two bits of data. In still another embodiment, each of the plurality of memory cells included in the memory cell array 110 may be a triple-level cell storing three bits of data. In still another embodiment, each of the plurality of memory cells included in the memory cell array 110 may be a quad-level cell storing four bits of data. According to an embodiment, the memory cell array 110 may include a plurality of memory cells each storing five or more bits of data.

The address decoder 120, the read and write circuit 130, the control logic 140, and the voltage generator 150 operate as a peripheral circuit that drives the memory cell array 110. The address decoder 120 is connected to the memory cell array 110 through the word lines WL. The address decoder 120 is configured to operate in response to control of the control logic 140. The address decoder 120 receives an address through an input/output buffer (not shown) inside the semiconductor memory device 100.

The address decoder 120 is configured to decode a block address among received addresses. The address decoder 120 selects at least one memory block according to the decoded block address. In addition, the address decoder 120 applies a read voltage Vread generated by the voltage generator 150 to a selected word line among the selected memory block at a read voltage application operation during a read operation, and applies a pass voltage Vpass to the remaining unselected word lines. In addition, the address decoder 120 applies a verify voltage generated by the voltage generator 150 to the selected word line among the selected memory block and applies the pass voltage Vpass to the remaining unselected word lines during a program verify operation.

The address decoder 120 is configured to decode a column address of the received addresses. The address decoder 120 transmits the decoded column address to the read and write circuit 130.

The read operation and a program operation of the semiconductor memory device 100 are performed in a page unit. Addresses received at a time of a request of the read operation and the program operation include a block address, a row address, and a column address. The address decoder 120 selects one memory block and one word line according to the block address and the row address. The column address is decoded by the address decoder 120 and is provided to the read and write circuit 130.

The address decoder 120 may include a block decoder, a row decoder, a column decoder, an address buffer, and the like.

The read and write circuit 130 includes a plurality of page buffers PB1 to PBm. The read and write circuit 130 may operate as a "read circuit" during a read operation of the memory cell array 110 and may operate as a "write circuit" during a write operation of the memory cell array 110. The plurality of page buffers PB1 to PBm are connected to the memory cell array 110 through the bit lines BL1 to BLm. During the read operation and the program verify operation, in order to sense a threshold voltage of the memory cells, the plurality of page buffers PB1 to PBm sense a change of an amount of a current flowing according to a program state of a corresponding memory cell through a sensing node while continuously supplying a sensing current to the bit lines connected to the memory cells, and latches the sensed change as sensing data. The read and write circuit 130 operates in response to page buffer control signals output from the control logic 140.

During the read operation, the read and write circuit 130 senses data of the memory cell, temporarily stores read data, and outputs data DATA to the input/output buffer (not shown) of the semiconductor memory device 100. In an embodiment, the read and write circuit 130 may include a column selection circuit, and the like, in addition to the page buffers (or page registers).

The control logic 140 is connected to the address decoder 120, the read and write circuit 130, and the voltage generator 150. The control logic 140 receives a command CMD and a control signal CTRL through the input/output buffer (not shown) of the semiconductor memory device 100. The control logic 140 is configured to control overall operations of the semiconductor memory device 100 in response to the control signal CTRL. In addition, the control logic 140 outputs a control signal for adjusting a sensing node precharge potential level of the plurality of page buffers PB1 to PBm. The control logic 140 may control the read and write circuit 130 to perform the read operation of the memory cell array 110.

The voltage generator 150 generates the read voltage Vread and the pass voltage Vpass during the read operation in response to the control signal output from the control logic 140. In order to generate a plurality of voltages having various voltage levels, the voltage generator 150 may include a plurality of pumping capacitors that receive an internal power voltage, and generate the plurality of voltages by selectively activating the plurality of pumping capacitors in response to the control of the control logic 140.

The address decoder 120, the read and write circuit 130, and the voltage generator 150 may function as the "peripheral circuit" that performs the read operation, the write operation, and the erase operation on the memory cell array 110. The peripheral circuit performs the read operation, the write operation, and the erase operation on the memory cell array 110 based on the control of the control logic 140.

Each of the plurality of memory blocks BLK1 to BLKz included in the memory cell array 110 may have a three-dimensional structure. Each memory block includes a plurality of memory cells stacked on a substrate.

Figure 3:
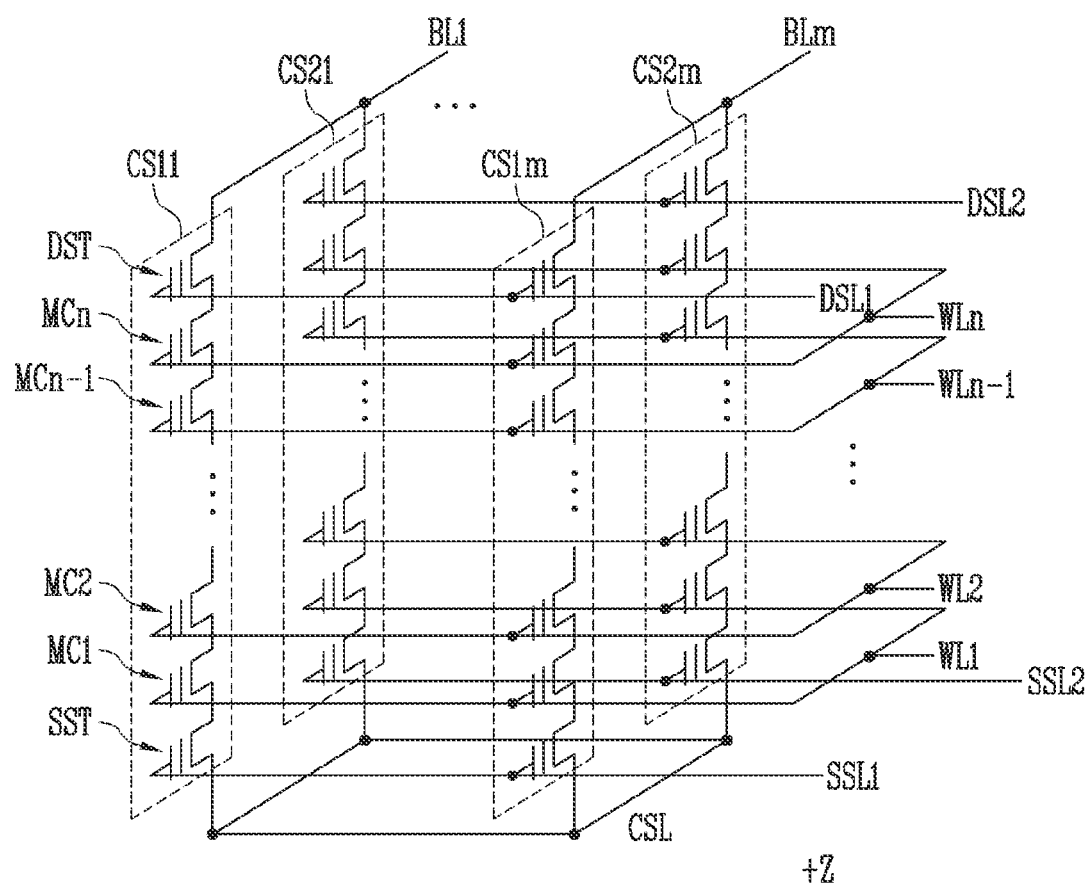
FIG. 3 is a circuit diagram illustrating a memory block among memory blocks of FIG. 1 according to an embodiment of the present disclosure.

FIG. 3 is a circuit diagram illustrating a memory block BLKa among the memory blocks BLK1 to BLKz of FIG. 1 according to an embodiment of the present disclosure.

Referring to FIG. 3, the memory block BLKa includes a plurality of cell strings CS11 to CS1m and CS21 to CS2m. In the memory block BLKa, m cell strings are arranged in a row direction (that is, a +X direction). In FIG. 3, two cell strings are arranged in a column direction (that is, a +Y direction). However, this is for convenience of description and it may be understood that three or more cell strings may be arranged in the column direction.

Each of the plurality of cell strings CS11 to CS1m and CS21 to CS2m includes at least one source select transistor SST, first to n-th memory cells MC1 to MCn, and at least one drain select transistor DST.

Each of the source select transistor SST and the drain select transistor DST and the memory cells MC1 to MCn may have a similar structure. In an embodiment, each of the source select transistor SST and the drain select transistor DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is connected between a common source line CSL and the memory cells MC1 to MCn.

In an embodiment, the source select transistors of the cell strings arranged in the same row are connected to a source select line extending in the row direction, and the source select transistors of the cell strings arranged in different rows are connected to different source select lines. In FIG. 3, the source select transistors of the cell strings CS11 to CS1m of a first row are connected to a first source select line SSL1. The source select transistors of the cell strings CS21 to CS2m of a second row are connected to a second source select line SSL2.

In another embodiment, the source select transistors of the cell strings CS11 to CS1m and CS21 to CS2m may be commonly connected to one source select line.

The first to n-th memory cells MC1 to MCn of each cell string are connected in series between the source select transistor SST and the drain select transistor DST. Gates of the first to n-th memory cells MC1 to MCn are connected to first to n-th word lines WL1 to WLn, respectively.

The drain select transistor DST of each cell string is connected between a corresponding bit line and the memory cells MC1 to MCn. Cell strings arranged in the row direction are connected to the drain select line extending in the row direction. The drain select transistors of the cell strings CS11 to CS1m of the first row are connected to a first drain select line DSL1. The drain select transistors of the cell strings CS21 to CS2m of the second row are connected to a second drain select line DSL2.

The cell strings arranged in the column direction are connected to the bit lines extending in the column direction. In FIG. 3, the cell strings CS11 and CS21 of the first column are connected to the first bit line BL1. The cell strings CS1m and CS2m of the m-th column are connected to the m-th bit line BLm.

The memory cells connected to the same word line in the cell strings arranged in the row direction configure one page. For example, the memory cells connected to the first word line WL1, among the cell strings CS11 to CS1m of the first row configure one page. The memory cells connected to the first word line WL1, among the cell strings CS21 to CS2m of the second row configure another page. The cell strings arranged in one row direction may be selected by selecting any of the drain select lines DSL1 and DSL2. One page of the selected cell strings may be selected by selecting any of the word lines WL1 to WLn.

In another embodiment, even bit lines and odd bit lines may be provided instead of the first to m-th bit lines BL1 to BLm. In addition, even-numbered cell strings among the cell strings CS11 to CS1m or CS21 to SC2m arranged in the row direction may be connected to the bit lines, and odd-numbered cell strings among the cell strings CS11 to CS1m or CS21 to CS2m arranged in the row direction may be connected to odd bit lines, respectively.

In an embodiment, at least one of the first to n-th memory cells MC1 to MCn may be used as a dummy memory cell. For example, at least one or more dummy memory cells are provided to reduce an electric field between the source select transistor SST and the memory cells MC1 to MCn. Alternatively, at least one or more dummy memory cells are provided to reduce an electric field between the drain select transistor DST and the memory cells MC1 to MCn. As more dummy memory cells are provided, reliability of an operation for the memory block BLKa is improved, however, the size of the memory block BLKa increases. As less memory cells are provided, the size of the memory block BLKa may be reduced, however, the reliability of the operation for the memory block BLKa may be reduced.

In order to efficiently control at least one dummy memory cell, each of the dummy memory cells may have a required threshold voltage. Before or after an erase operation for the memory block BLKa, program operations for all or a part of the dummy memory cells may be performed. When the erase operation is performed after the program operation is performed, the dummy memory cells may have a required threshold voltage by controlling a voltage applied to dummy word lines connected to the respective dummy memory cells.

As shown in FIG. 3, the memory blocks BLK1 to BLKz of the semiconductor memory device 100 may be configured as memory blocks of a three-dimensional structure. However, the present disclosure is not limited thereto, and the memory blocks BLK1 to BLKz of the semiconductor memory device 100 may be configured as memory blocks of a two-dimensional structure.

Figure 4:
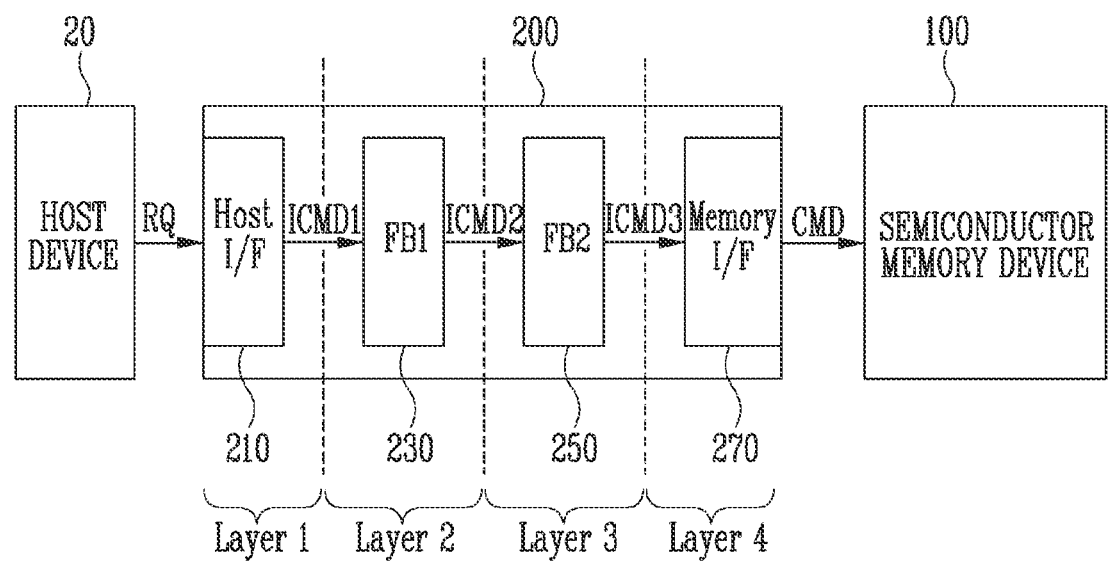
FIG. 4 is a block diagram illustrating an example of a controller of FIG. 1 according to an embodiment of the present disclosure.

FIG. 4 is a block diagram illustrating an example of the controller of FIG. 1 according to an embodiment of the present disclosure.

Referring to FIG. 4, the controller 200 includes a host interface (Host I/F) 210, a first function block 230, a second function block 250, and a memory interface (Memory I/F) 270.

The first and second function blocks 230 and 250 may control an overall operation of the controller 200. As an example, each of the first and second function blocks FB1; 230 and FB2; 250 may be a processor. In this case, the first function block 230 may be a processor that drives a first firmware FW1. In addition, the second function block 250 may be a processor that drives a second firmware FW2.

The host interface 210 may receive the request RQ from the host device 20 and may generate a first internal command ICMD1 in response thereto. The host interface 210 may transmit the generated first internal command ICMD1 to the first function block 230.

The first function block 230 may control a reception operation of write data transmitted from the host device 20 through the host interface 210, by the first firmware FW1. In addition, the first function block 230 may transmit data read from the semiconductor memory device 100 to the host device 20 through the host interface 210, by the first firmware FW1.

In addition, for example, the first firmware FW1 driven by the first function block 230 may include a flash translation layer (hereinafter, referred to as 'FTL'). The FTL may provide an interface between an external device and the semiconductor memory device 100 so that the semiconductor memory device 100 is efficiently used. For example, the FTL may serve to convert a logical address received from an external device, for example, the host device 20, into a physical address used by the semiconductor memory device 100. The FTL may perform the above-described address conversion operation through a mapping table. For example, the logical address indicates a logical position of a storage area managed by the host device 20, and the physical address indicates a physical position of the semiconductor memory device 100 managed by the controller 200.

The FTL may perform an operation such as wear-leveling and garbage collection (GC) so that the semiconductor memory device 100 may be efficiently used. For example, the wear leveling indicates an operation of managing the number of programs/erasures of the plurality of memory blocks so that the number of programs/erasures of the plurality of memory blocks included in the semiconductor memory device 100 becomes uniform. For example, the GC indicates an operation of moving valid pages of some memory blocks among the plurality of memory blocks included in the semiconductor memory device 100 to another memory block and then erasing some memory blocks. Some erased memory blocks may be used as free blocks. The FTL may secure the free block of the semiconductor memory device 100 by performing the GC.

To this end, the first function block 230 may generate a second internal command ICMD2 in response to the first internal command ICMD1. The first function block 230 may transmit the second internal command ICMD2 to the second function block 250.

The second function block 250 may convert write data to be transmitted to the semiconductor memory device 100, by the second firmware FW2. For example, the second function block 250 may encode the write data to be transmitted to the semiconductor memory device 100. The encoding operation may be performed for various purposes. For example, in order to perform an error correction operation on data read from the semiconductor memory device 100, the write data may be encoded for the error correction operation before being transmitted to the semiconductor memory device 100. During a subsequent read operation, the second function block 250 may perform the error correction operation on the read data.

As another example, the second function block 250 may randomize the write data to be transmitted to the semiconductor memory device 100. During a subsequent read operation, the second function block 250 may perform a de-randomizing operation on the read data.

In this case, the second function block FB2; 250 may generate a third internal command ICMD3 in response to the second internal command ICMD2. The second function block FB2 250 may transmit the third internal command ICMD3 to the memory interface 270.

The first function block FB1; 230 and the second function block FB2; 250 may be configured as separate processors that are different from each other, but may be integrated into one processor. When the first function block FB1; 230 and the second function block FB2; 250 are configured as one processor, the one processor may drive the first firmware FW1 and the second firmware FW2.

The controller 200 may communicate with the semiconductor memory device 100 through the memory interface 270. For example, the memory interface 270 may include a NAND interface. The memory interface 270 may generate a command CMD directly transmitted to the semiconductor memory device 100 in response to the third internal command ICMD3 received from the second function block 250.

As described above, in order to generate the command CMD to be transmitted to the semiconductor memory device 100 in response to the request RQ received from the host device 20, the controller 200 may internally generate the first internal command ICMD1, the second internal command ICMD2, and the third internal command ICMD3. The first internal command ICMD1, the second internal command ICMD2, and the third internal command ICMD3 may be generated for communication between layers in the controller 200.

For example, the host interface 210 may configure a first layer Layer 1. The first function block 230 may configure a second layer Layer 2. The second function block 250 may configure a third layer Layer 3. The memory interface 270 may configure a fourth layer Layer 4. The first layer Layer 1 may communicate with the second layer Layer 2 through the first internal command ICMD1. The second layer Layer 2 may communicate with the third layer Layer 3 through the second internal command ICMD2. The third layer Layer 3 may communicate with the fourth layer Layer 4 through the third internal command ICMD3.

The controller 200 includes the four layers in FIG. 4, however, this is an example. For example, the controller 200 including five or more layers is also configurable, and in this case, the number of function blocks may also be three or more.

Figure 5:
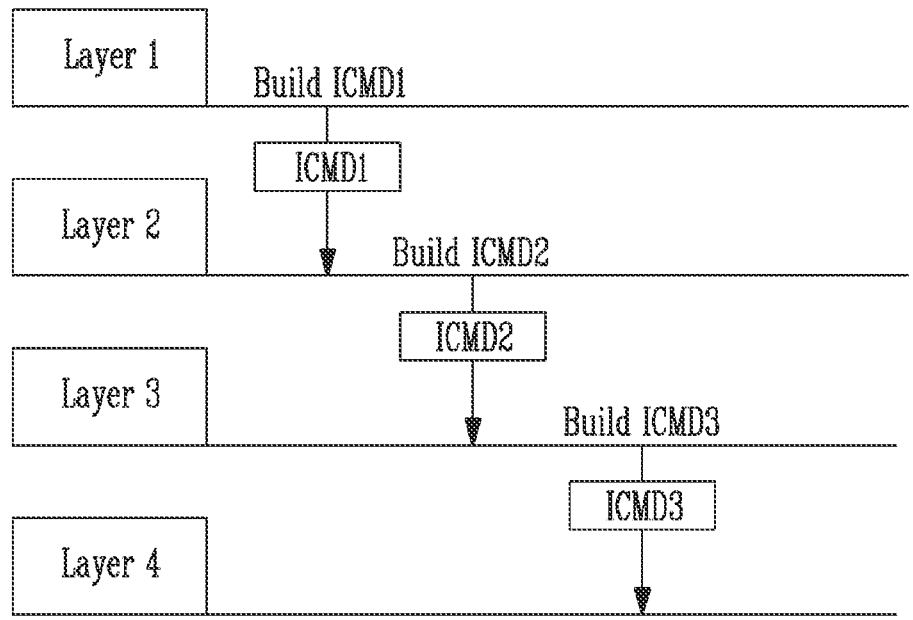
FIG. 5 is a diagram illustrating an internal command generated in each layer of the controller 200 of FIG. 4 according to an embodiment of the present disclosure.

FIG. 5 is a diagram illustrating an internal command generated in each layer of the controller 200 of FIG. 4 according to an embodiment of the present disclosure. Hereinafter, the present disclosure is described with reference to FIGS. 4 and 5 together.

Referring to FIG. 5, the host interface 210 corresponding to the first layer Layer 1 may generate the first internal command ICMD1 in response to the request from the host device 20. The generated first internal command ICMD1 is transmitted to the second layer Layer 2. The first function block 230 corresponding to the second layer Layer 2 may generate the second internal command ICMD2 in response to the first internal command ICMD1. The generated second internal command ICMD2 is transmitted to the third layer Layer 3. The second function block 250 corresponding to the third layer Layer 3 may generate the third internal command ICMD3 in response to the second internal command ICMD2. The generated third internal command ICMD3 is transmitted to the fourth layer Layer 4.

As described above, the first to third internal commands ICMD1, ICMD2, and ICMD3 are sequentially generated. According to the example referring to FIGS. 4 and 5, the controller 200 sequentially generates the first to third internal commands ICMD1, ICMD2, and ICMD3 in response to the request RQ received from the host device 20, and finally generates the command CMD and transmits the command CMD to the semiconductor memory device 100. That is, a time for internally sequentially generating the first to third internal commands ICMD1, ICMD2, and ICMD3 is consumed, and this becomes a reason of a decrease of an operation speed of the controller 200 and the storage device 10 including the same.

Figure 6:
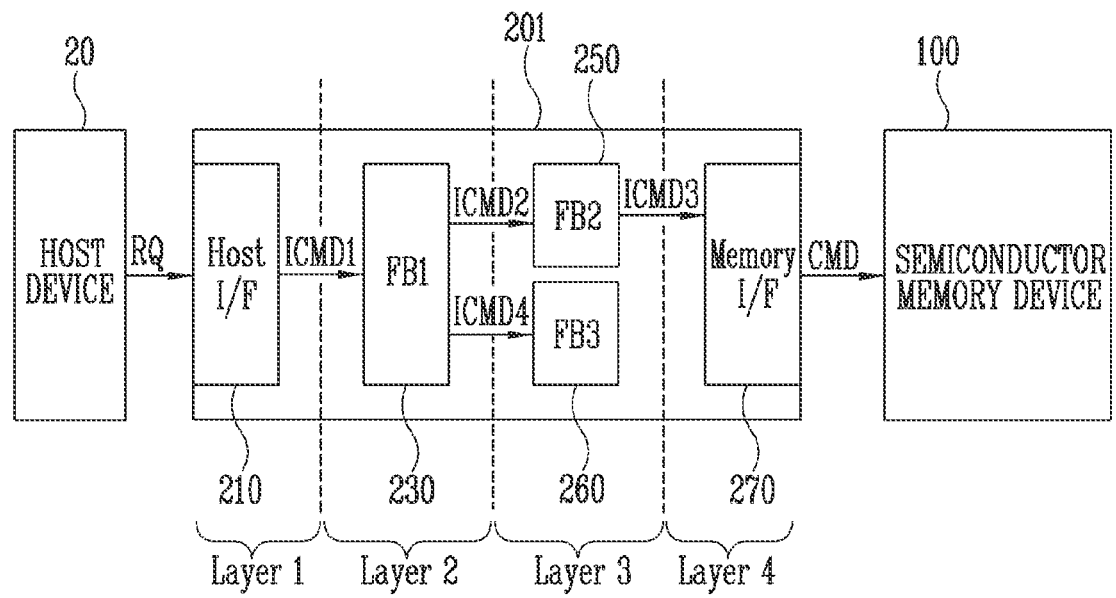
FIG. 6 is a block diagram illustrating another example of the controller of FIG. 1 according to an embodiment of the present disclosure.

FIG. 6 is a block diagram illustrating another example of the controller of FIG. 1 according to an embodiment of the present disclosure. Referring to FIG. 6, the controller 201 includes a host interface (Host I/F) 210, a first function block 230, a second function block 250, a third function block 260, and a memory interface (Memory I/F) 270. Compared to the controller 200 of FIG. 4, the controller 201 of FIG. 6 further includes the third function block 260. Hereinafter, an overlapping description is omitted.

The first function block 230 may further generate a fourth internal command ICMD4 in addition to the second internal command ICMD2. The first function block 230 may transmit the fourth internal command ICMD4 to the third function block 260. The third function block 260 may operate based on the fourth internal command ICMD4. As shown in FIG. 6, the fourth internal command ICMD4 is an internal command generated in response to the request RQ from the host device 20, but the fourth internal command ICMD4 may be an internal command regardless of generation of the command CMD transmitted to the semiconductor memory device 100. That is, the third function block 260 may perform another operation regardless of the generation of the command CMD transmitted to the semiconductor memory device 100. Also in this case, the third function block 260 may be included in the third layer Layer 3. That is, two or more function blocks may be included in one layer.

Figure 7:
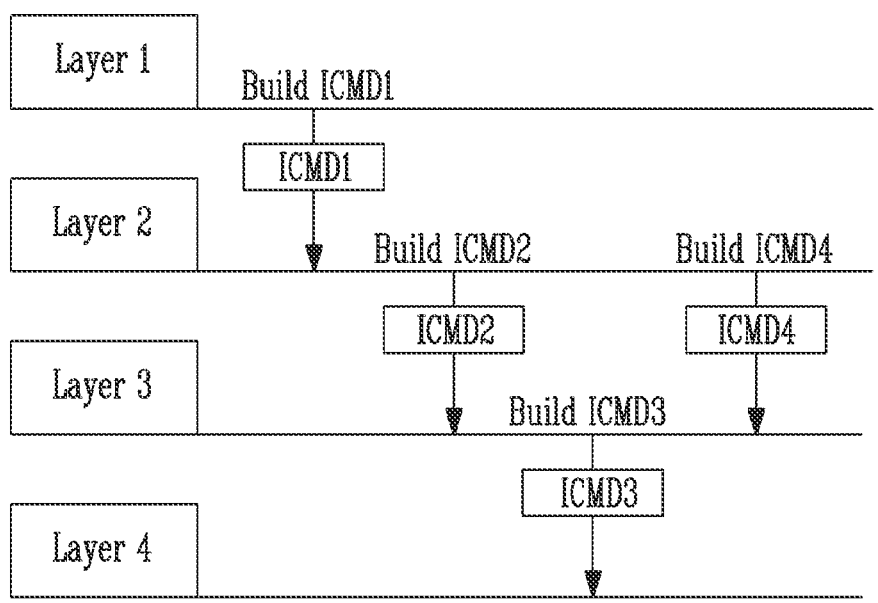
FIG. 7 is a diagram illustrating an internal command generated in each layer of the controller of FIG. 6 according to an embodiment of the present disclosure.

FIG. 7 is a diagram illustrating an internal command generated in each layer of the controller 201 of FIG. 6 according to an embodiment of the present disclosure. Referring to FIG. 7, the host interface 210 corresponding to the first layer Layer 1 may generate the first internal command ICMD1 in response to the request from the host device 20. The generated first internal command ICMD1 is transmitted to the second layer Layer 2. The first function block 230 corresponding to the second layer Layer 2 may generate the second internal command ICMD2 in response to the first internal command ICMD1. The generated second internal command ICMD2 is transmitted to the second function block of the third layer Layer 3. In addition, the first function block 230 may further generate the fourth internal command ICMD4 in response to the first internal command ICMD1. The generated fourth internal command ICMD4 is transmitted to the third function block of the third layer Layer 3. The second function block 250 included in the third layer Layer 3 may generate the third internal command ICMD3 in response to the second internal command ICMD2. The generated third internal command ICMD3 is transmitted to the fourth layer Layer 4. In addition, the third function block 260 included in the third layer Layer 3 may perform an operation regardless of the generation of the command CMD in response to the fourth internal command ICMD4.

As described above, the first to fourth internal commands ICMD1, ICMD2, ICMD3, and ICMD4 are sequentially generated. According to the example referring to FIGS. 6 and 7, the controller 200 sequentially generates the first and second internal commands ICMD1 and ICMD2 in response to the request RQ received from the host device 20, and generates the third internal command ICMD3 in response to the second internal command ICMD2, and generates the fourth internal command ICMD4 in response to the first internal command ICMD1. That is, a time for internally generating the first to fourth internal commands ICMD1, ICMD2, ICMD3, and ICMD4 is consumed, and this becomes a reason of a decrease of an operation speed of the controller 201 and the storage device including the same.

The controller according to an embodiment of the present disclosure includes an internal command cache for temporarily storing the internal commands. Accordingly, the internal commands stored in the internal command cache are not required to be sequentially generated from an upper layer to a lower layer and are output immediately. Accordingly, the operation speed of the controller and the storage device including the same is improved.

Figure 8:
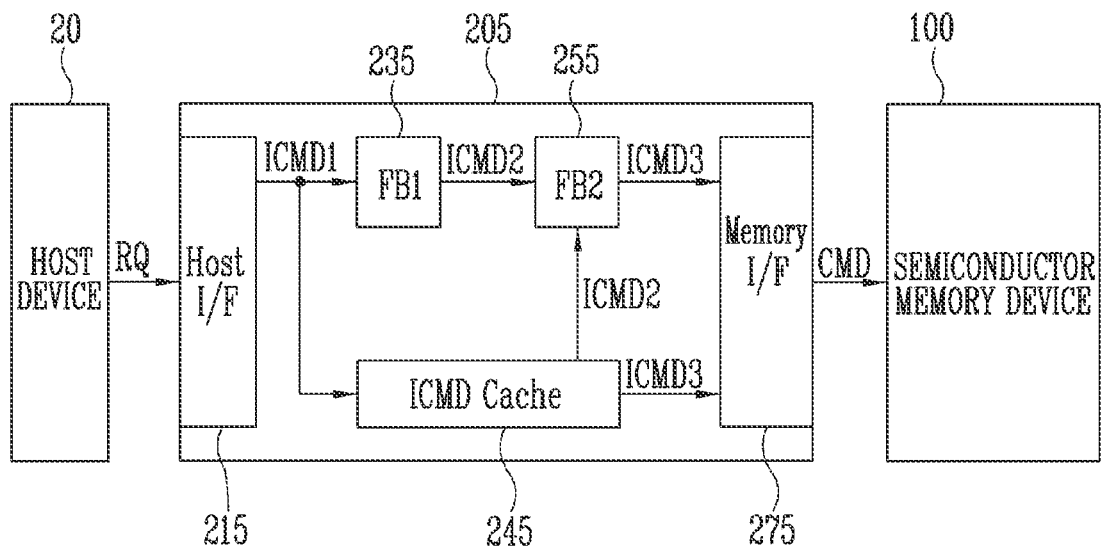
FIG. 8 is a block diagram illustrating a controller according to an embodiment of the present disclosure.

FIG. 8 is a block diagram illustrating a controller according to an embodiment of the present disclosure.

Referring to FIG. 8, the controller 205 includes a host interface (Host I/F) 215, a first function block 235, a second function block 255, an internal command cache 245, and a memory interface (Memory I/F) 275. The host interface 215, the first function block 235, the second function block 255, and the memory interface 275 shown in FIG. 8 may be components substantially identical to the host interface 210, the first function block 230, the second function block 250, and the memory interface 270 shown in FIG. 4, respectively. That is, compared to the controller 200 of FIG. 4, the controller 205 of FIG. 8 further includes an internal command cache 245. Furthermore, the first function block 235, the second function block 255, the first function block 230, and the second function block 250 include all circuits, systems, software, firmware and devices necessary for their respective operations and functions. Hereinafter, an overlapping description is omitted.

The first internal command ICMD1 output from the host interface 215 may be transmitted to the first function block FB1; 230 and the internal command cache 245. When the first internal command ICMD1 and internal commands of lower layers corresponding to the first internal command ICMD1 are stored in the internal command cache 245, the internal command cache 245 may transmit the stored internal commands to the lower layers. For example, when the second and third internal commands ICMD2 and ICMD3 corresponding to the first internal command ICMD1 are stored in the internal command cache 245, that is, when a cache-hit occurs, the internal command cache 245 transmits the second internal command ICMD2 to the second function block 255, and transmits the third internal command ICMD3 to the memory interface 275. In this case, the first function block 235 may not generate the second internal command ICMD2. In addition, the second function block 255 may not generate the third internal command ICMD3.

Moreover, when the second and third internal commands ICMD2 and ICMD3 corresponding to the first internal command ICMD1 are not stored in the internal command cache 245, that is, when a cache-miss occurs, the first function block 235 may generate the second internal command ICMD2 and transmit the second internal command ICMD2 to the second function block 255. In addition, the second function block 255 may generate the third internal command ICMD3 in response to the second internal command ICMD2.

Figure 9:
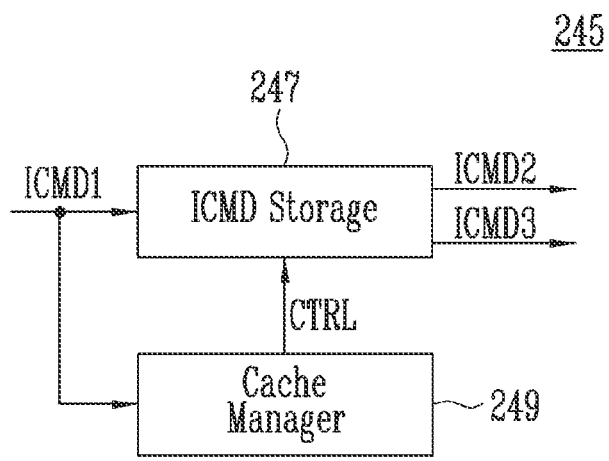
FIG. 9 is a block diagram illustrating an internal command cache shown in FIG. 8 according to an embodiment of the present disclosure.

FIG. 9 is a block diagram illustrating the internal command cache shown in FIG. 8 according to an embodiment of the present disclosure.

Referring to FIG. 9, the internal command cache 245 may include an internal command storage 247 and a cache manager 249. The internal command storage 247 may store a reference internal command and the internal commands of the lower layers corresponding to the reference internal command. In the example of FIG. 8, the first internal command ICMD1 may be the reference internal command and the second and third internal commands ICMD2 and ICMD3 may be the internal commands corresponding to the reference internal command.

The cache manager 249 receives the internal command input to the internal command cache 245 and determines whether the corresponding internal command is stored in the internal command storage 247. When the received internal command is stored in the internal command storage 247, the cache manager 249 controls the internal command storage 247 to output the internal commands of the lower layer corresponding to the received internal command through a control signal CTRL.

For example, as shown in FIG. 9, when the first internal command ICMD1 is input to the internal command cache 245, the cache manager 249 determines whether the first internal command ICMD1 is stored as the reference internal command in the internal command storage 247. When the first internal command ICMD1 is stored as the reference internal command in the internal command storage 247, the cache manager 249 controls the internal command storage 247 to output the second and third internal commands ICMD2 and ICMD3 corresponding to the received first internal command ICMD1 through the control signal CTRL.

In addition, the cache manager 249 may replace the internal commands stored in the internal command storage 247 as necessary. Various replacement policies may be used to replace the internal commands stored in the internal command storage 247.

As an example, the cache manager 249 may replace the internal commands stored in the internal command storage 247 according to a least frequently used (LFU) policy. In this case, the cache manager 249 may control the internal command storage 247 to remove internal commands of which a use frequency is lowest among the stored internal commands.

As another example, the cache manager 249 may replace the internal commands stored in the internal command storage 247 according to a least recently used (LRU) policy. In this case, the cache manager 249 may control the internal command storage 247 to remove longest unused internal commands among the stored internal commands.

As still another example, the cache manager 249 may manage to preferentially store internal commands having a high ratio of a time required to generate the internal commands to an entire operation time in the internal command storage 247. Taking a random read operation as an example, the time required to generate the internal command is relatively long compared to a time required for an entire random read operation. On the other hand, in a case of a sequential read operation, the time required to generate the internal command is relatively short compared to the time required for an entire sequential read operation. The cache manager 249 may manage the internal command storage 247 to store the internal commands corresponding to the random read operation rather than the internal commands corresponding to the sequential read operation.

Figure 10A:
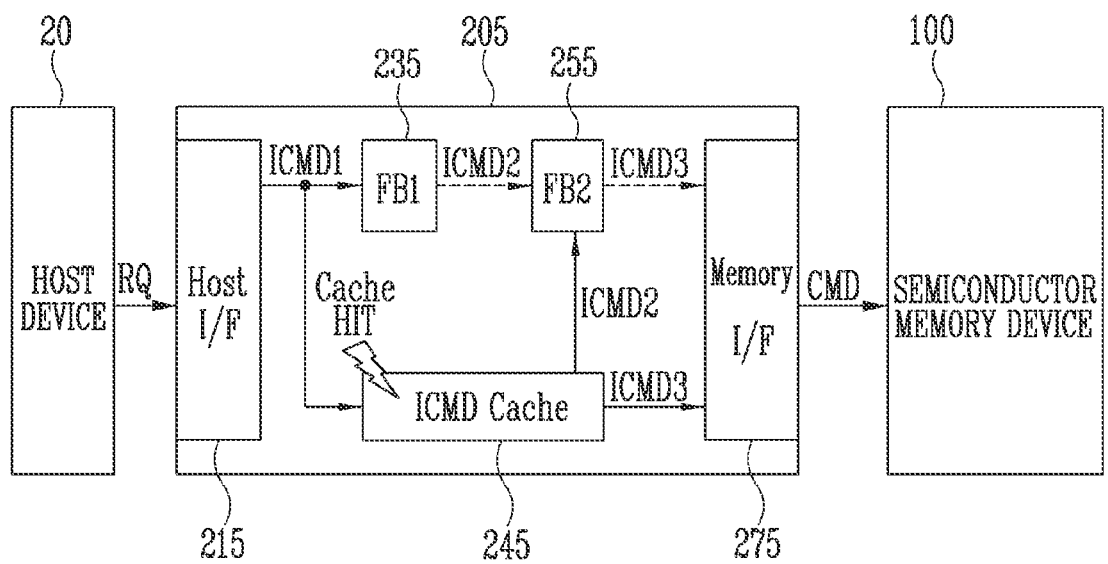
FIGS. 10A and 10B are block diagrams illustrating an operation of a controller according to an embodiment of the present disclosure.
Figure 10B:
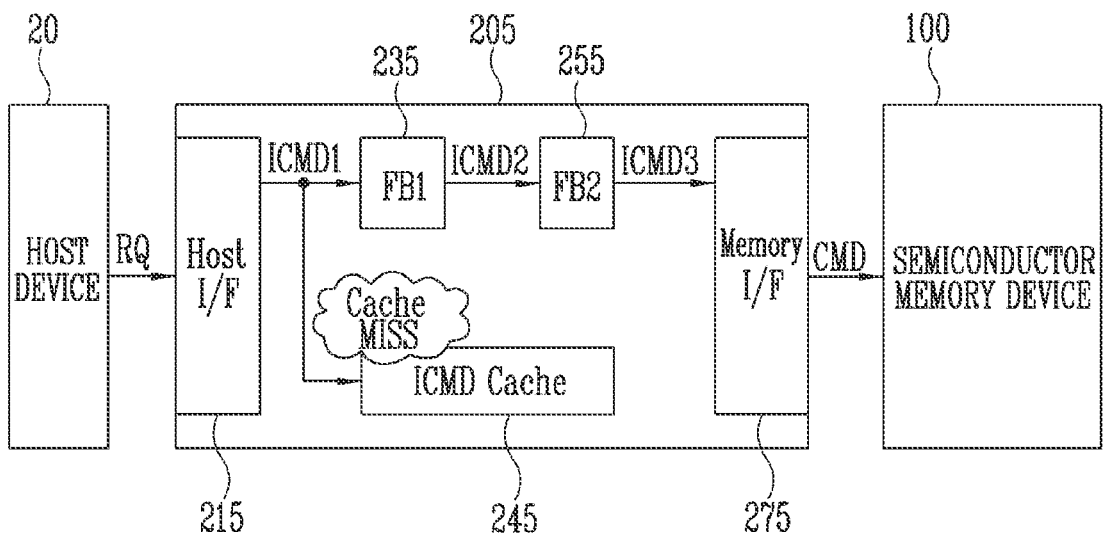

FIGS. 10A and 10B are block diagrams illustrating an operation of a controller according to an embodiment of the present disclosure.

As shown in FIG. 10A, when the first internal command ICMD1 and the second and third internal commands ICMD2 and ICMD3 corresponding to the first internal command ICMD1 are stored in the internal command cache 245, that is, when the cache-hit occurs, the internal command cache 245 transmits the second internal command ICMD2 to the second function block 255 and transmits the third internal command ICMD3 to the memory interface 275. In this case, the first function block 235 may not generate the second internal command ICMD2. In addition, the second function block 255 may not generate the third internal command ICMD3.

On the other hand, as shown in FIG. 10B, when the second and third internal commands ICMD2 and ICMD3 corresponding to the first internal command ICMD1 are not stored in the internal command cache 245, that is, when the cache-miss occurs, the first function block 235 may generate the second internal command ICMD2 and transmits the second internal command ICMD2 to the second function block 255. In addition, the second function block 255 may generate the third internal command ICMD3 in response to the second internal command ICMD2. In this case, the internal command cache 245 may not perform a separate operation.

Figure 11:
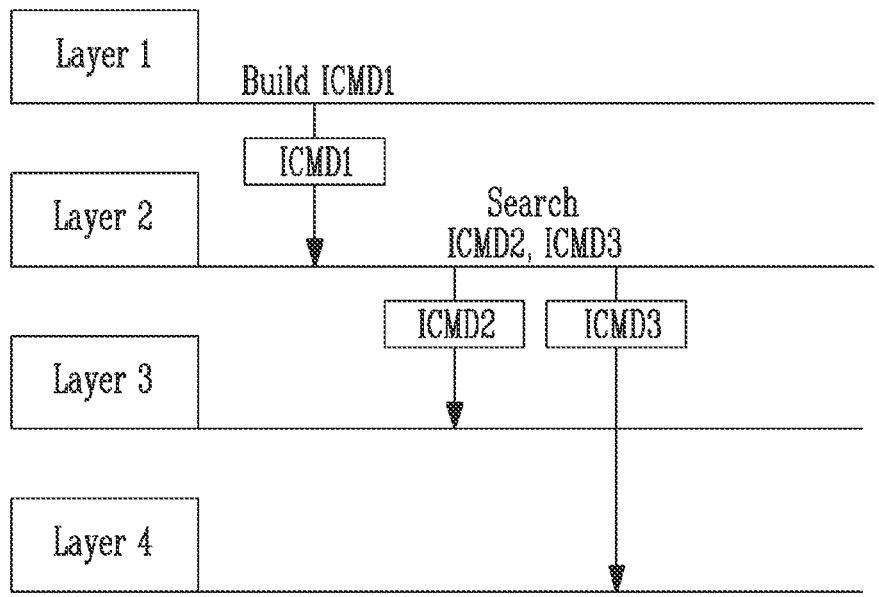
FIG. 11 is a diagram illustrating an internal command generated in each layer of the controller of FIG. 8 or obtained from a cache during the cache hit according to an embodiment of the present disclosure.

FIG. 11 is a diagram illustrating an internal command generated in each layer of the controller 205 of FIG. 8 or obtained from a cache during the cache hit according to an embodiment of the present disclosure.

Referring to FIG. 11, the host interface 210 corresponding to the first layer Layer 1 may generate the first internal command ICMD1 in response to the request from the host device 20. The generated first internal command ICMD1 is transmitted to the internal command cache 245. The internal command cache 245 determines whether the second and third internal commands ICMD2 and ICMD3 corresponding to the first internal command ICMD1 are stored. When the second and third internal commands ICMD2 and ICMD3 are stored in the internal command cache 245, the second internal command ICMD2 is transmitted to the third layer 3, and the third internal command ICMD3 is transmitted to the fourth layer Layer 4 at the same time.

Therefore, in accordance with the controller 205 according to an embodiment of the present disclosure, the second and third internal commands ICMD2 and ICMD3 are not required to be sequentially generated after the first internal command ICMD1 is generated, and the second and third internal commands ICMD2 and ICMD3 may be immediately transmitted to the lower layers Layer 3 and Layer 4. Accordingly, the operation speed of the controller 205 and the storage device including the same is improved.

Figure 12:
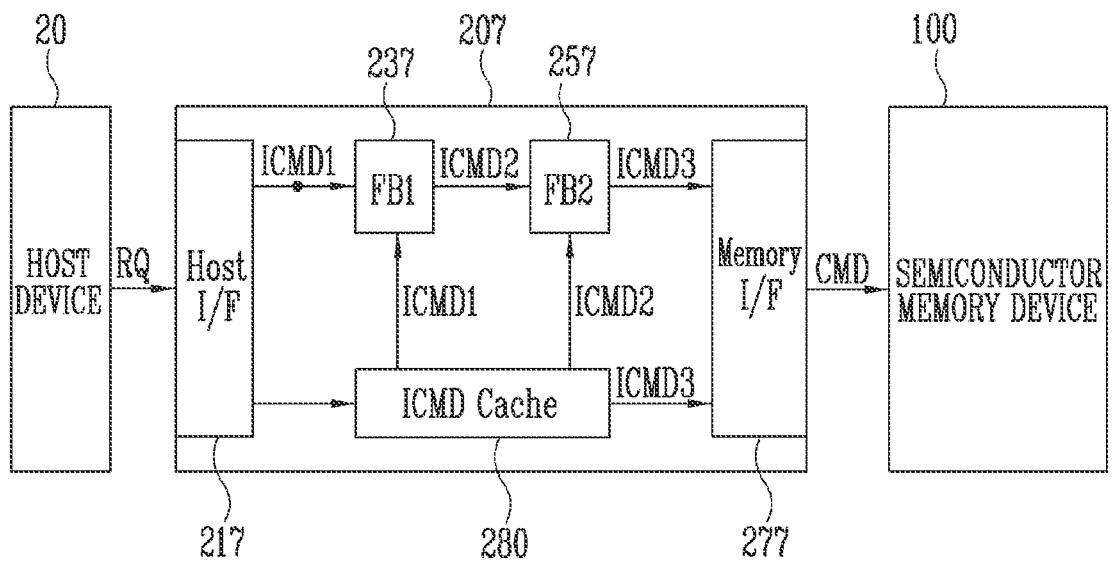
FIG. 12 is a block diagram illustrating a controller according to another embodiment of the present disclosure.

FIG. 12 is a block diagram illustrating a controller according to another embodiment of the present disclosure.

Referring to FIG. 12, the controller 207 includes a host interface (Host I/F) 217, a first function block 237, a second function block 257, an internal command cache 280, and a memory interface (Memory I/F) 277. The host interface 217, the first function block 237, the second function block 257, and the memory interface 277 shown in FIG. 12 may be components substantially identical to the host interface 215, the first function block 235, the second function block 255, and the memory interface 275 shown in FIG. 8, respectively. Therefore, an overlapping description is omitted.

The internal command cache 280 of FIG. 12 receives the request RQ from the host device 20 through the host interface 217. The internal command cache 280 determines whether the first to third internal commands ICMD1, ICMD2, and ICMD3 corresponding to the request RQ are stored. When the first to third internal commands ICMD1, ICMD2, and ICMD3 corresponding to the request RQ from the host device 20 are stored in the internal command cache 280, the internal command cache 280 may transmit the first to third internal commands ICMD1, ICMD2, and ICMD3 to the first function block 237, the second function block 257, and the memory interface 277, respectively. In this case, the host interface 217 may not generate the first internal command ICMD1. In addition, the first function block 237 may not generate the second internal command ICMD2. Furthermore, the second function block 257 may not generate the third internal command ICMD3.

When the first to third internal commands ICMD1, ICMD2, and ICMD3 corresponding to the request RQ from the host device 20 are not stored in the internal command cache 280, that is, when the cache-miss occurs, the host interface 217 may generate the first internal command ICMD1. The first function block 237 may generate the second internal command ICMD2 in response to the first internal command ICMD1, and transmit the second internal command ICMD2 to the second function block 257. In addition, the second function block 257 may generate the third internal command ICMD3 in response to the second internal command ICMD2.

Figure 13:
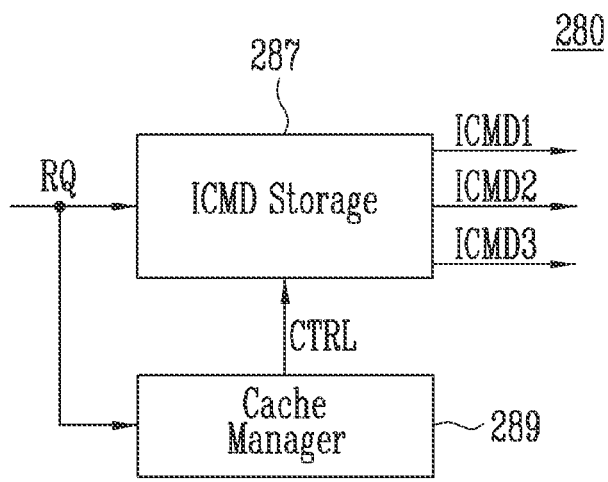
FIG. 13 is a block diagram illustrating an internal command cache shown in FIG. 12 according to an embodiment of the present disclosure.

FIG. 13 is a block diagram illustrating the internal command cache shown in FIG. 12 according to an embodiment of the present disclosure.

Referring to FIG. 13, the internal command cache 280 may include an internal command storage 287 and a cache manager 289. The internal command storage 287 may store a reference request and internal commands of the lower layers corresponding to the reference request. In the example of FIG. 12, the request RQ may be the reference request and the first to third internal commands ICMD1, ICMD2 and ICMD3 may be the internal commands corresponding to the reference request.

The cache manager 289 receives the request RQ input to the internal command cache 280 and determines whether the request RQ is stored as the reference request in the internal command storage 287. When the received request RQ are stored as the reference request in the internal command storage 287, the cache manager 289 controls the internal command storage 287 to output the internal commands of the lower layers corresponding to the received request RQ through the control signal CTRL.

Figure 14:
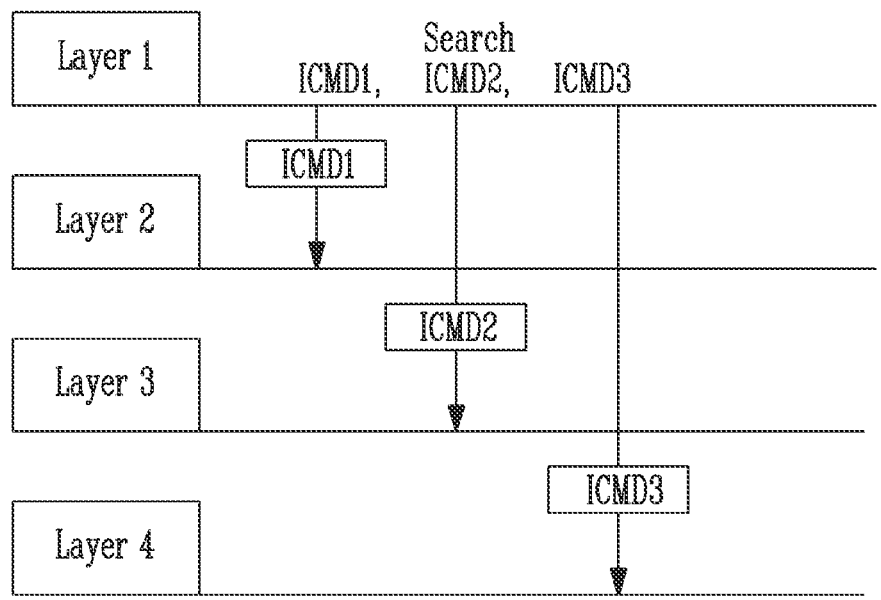
FIG. 14 is a diagram illustrating an internal command generated in each layer of the controller of FIG. 12 or obtained from a cache during a cache hit according to an embodiment of the present disclosure.

FIG. 14 is a diagram illustrating the internal command generated in each layer of the controller 207 of FIG. 12 or obtained from the cache during the cache hit according to an embodiment of the present disclosure.

Referring to FIG. 14, when the internal command cache 280 receives the request RQ through the host interface 217, the internal command cache 280 determines whether the internal commands ICMD1, ICMD2, and ICMD3 corresponding to the request RQ are stored. When the internal commands ICMD1, ICMD2, and ICMD3 corresponding to the request RQ are stored, the internal command cache 280 may transmit the stored internal commands ICMD1, ICMD2, and ICMD3 to the second to fourth layers Layer 2, Layer 3, and Layer 4, respectively.

Therefore, in accordance with the controller 207 according to an embodiment of the present disclosure, when the internal commands ICMD1, ICMD2, and ICMD3 corresponding to the request RQ received from the host device 20 are cached, the internal commands ICMD1, ICMD2, and ICMD3 may not be required to be sequentially generated and may be immediately transmitted to the corresponding lower layers Layer 2, Layer 3, and Layer 4. Accordingly, the operation speed of the controller 207 and the storage device including the same is improved.

FIGS. 15A and 15B are diagrams illustrating a configuration of the internal command storage shown in FIGS. 9 and 13, respectively according to an embodiment of the present disclosure.

Referring to FIG. 15A, the internal commands stored in the internal command storage 247 of FIG. 9 are shown. For example, referring to a first row of FIG. 15A, a received internal command, that is, a reference internal command, may be the first internal command ICMD1, and an internal command set of lower layers corresponding the first internal command ICMD1 may be the second and third internal commands ICMD2 and ICMD3. That is, when the internal command cache 245 receives the first internal command ICMD1, the internal command cache 245 outputs the second and third internal commands ICMD2 and ICMD3 to the lower layers.

Referring to a second row of FIG. 15A, the received internal command, that is, the reference internal command, may be the fourth internal command ICMD4, and the internal command set of lower layers corresponding to the fourth internal command ICMD4 may be a fifth internal command ICMD5. That is, when the internal command cache 245 receives the fourth internal command ICMD4, the internal command cache 245 outputs the fifth internal command ICMD5 to the lower layers.

In such a method, the internal command storage 247 may store k entries. Each entry may include the reference internal command and the internal command set of the lower layers corresponding to the reference internal command.

As described above, the cache manager 249 may replace the internal commands stored in the internal command storage 247 as necessary. For example, the cache manager 249 may remove one of the k entries stored in the internal command storage 247 and add a new entry. To this end, the cache manager 249 may use various replacement policies.

As an example, the cache manager 249 may replace the entries stored in the internal command storage 247 according to a least frequently used (LFU) policy. In this case, the cache manager 249 may control the internal command storage 247 to remove an entry of which a use frequency is lowest among the stored k entries.

As another example, the cache manager 249 may replace the entries stored in the internal command storage 247 according to a least recently used (LRU) policy. In this case, the cache manager 249 may control the internal command storage 247 to remove a longest unused entry among the stored k entries.

As still another example, the cache manager 249 may manage to preferentially store entries for internal commands having a high ratio of the time required to generate the internal commands to the entire operation time in the internal command storage 247. Taking the random read operation as an example, the time required to generate the internal command is relatively long compared to the time required for the entire random read operation. On the other hand, in the case of the sequential read operation, the time required to generate the internal command is relatively short compared to the time required for the entire sequential read operation. The cache manager 249 may manage the internal command storage 247 to store the entry corresponding to the random read operation rather than the entry corresponding to the sequential read operation.

Referring to FIG. 15B, the internal commands stored in the internal command storage 287 of FIG. 13 are shown. For example, referring to a first row of FIG. 15B, the received request, that is, the reference request may be a first request RQ1, and an internal command set of lower layers corresponding to the first request RQ1 may be the first to third internal commands ICMD1, ICMD2, and ICMD3. That is, when the internal command cache 280 receives the first request RQ1, the internal command cache 280 outputs the first to third internal commands ICMD1, ICMD2, and ICMD3 to the lower layers.

Referring to a second row of FIG. 15B, the received request, that is, the reference request may be a second request RQ2, and an internal command set of lower layers corresponding to the second request RQ2 may be the fourth and fifth internal commands ICMD4 and ICMD5. That is, when the internal command cache 280 receives the second request RQ2, the internal command cache 245 outputs the fourth and fifth internal commands ICMD4 and ICMD5 to the lower layers.

In such a method, the internal command storage 287 may store k entries. Each entry may include the reference request RQ and the internal command sets of the lower layers corresponding to the reference request RQ.

Figure 16B:
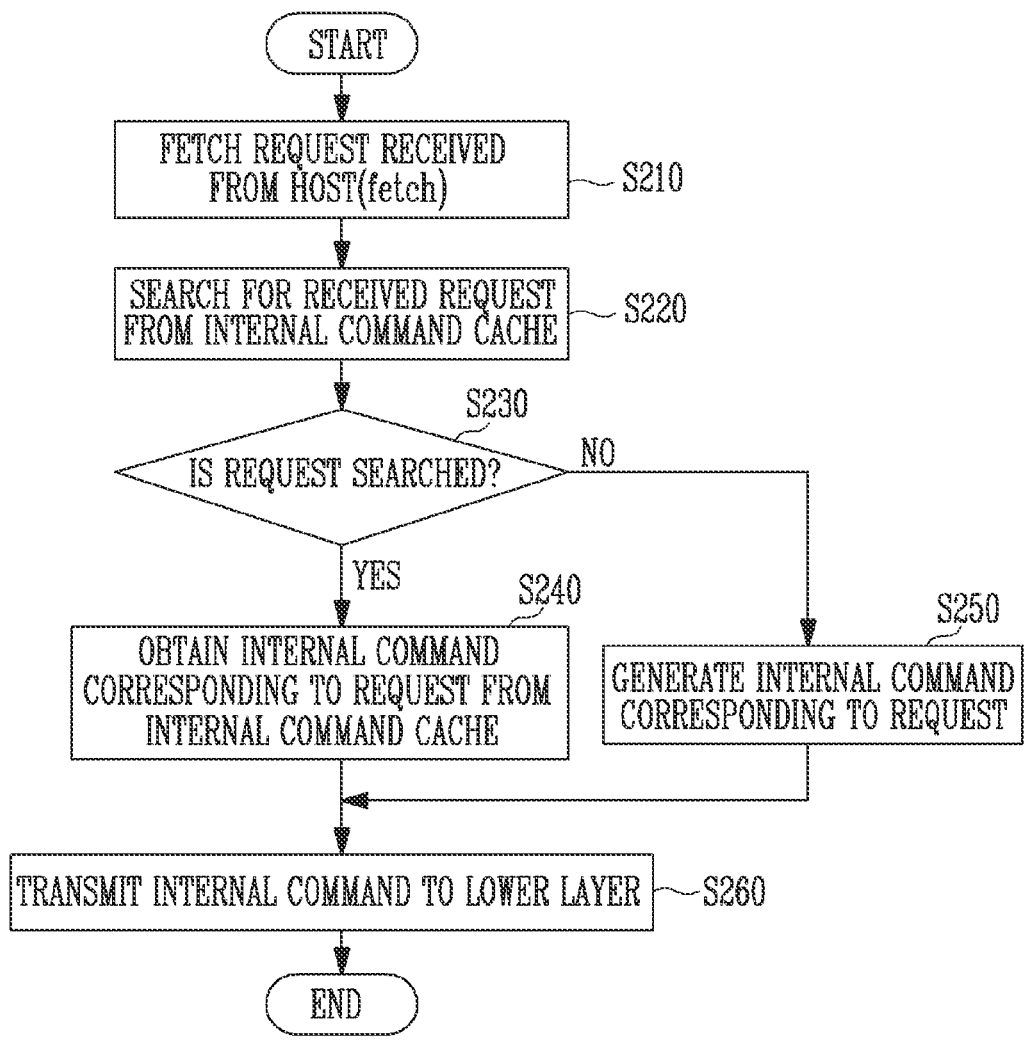

FIGS. 16A and 16B are flowcharts illustrating a method of operating a controller according to embodiments of the present disclosure.

Referring to FIG. 16A, a method of operating a controller according to embodiments of the present disclosure includes fetching the first internal command ICMD1 (S110), searching for the first internal command from the internal command cache (S120), and determining whether the first internal command is searched (S130). When the first internal command is searched (S130: Yes), the method of operating the controller further includes obtaining the second internal command corresponding to the first internal command from the internal command cache (S140) and transmitting the second internal command to the corresponding lower layer (S160).

In operation S110, as shown in FIG. 8, the first internal command ICMD1 may be output from the host interface 215 to the internal command cache 245. In operation S120, the internal command cache 245 searches for the first internal command ICMD1 from the internal command storage 247. When the first internal command ICMD1 that becomes a reference internal command is stored in the internal command storage 247 (S130: Yes), the second internal command ICMD2 corresponding to the lower layer of the first internal command ICMD1 may also be stored together. In this case, the internal command cache 245 obtains the stored second internal command ICMD2 (S140). Thereafter, the internal command cache 245 transmits the second internal command ICMD2 to the second function block 255 included in the third layer. At this time, operation S160 is performed by the internal command cache 245.

When the first internal command is not searched (S130: No), the method of operating the controller further includes generating the second internal command corresponding to the first internal command (S150) and transmitting the second internal command corresponding to the first internal command to the lower layer (S160).

When the first internal command ICMD1 is not stored as the reference internal command in the internal command storage 247 (S130: No), the first function block 235 generates the second internal command ICMD2 of the lower layer corresponding to the first internal command ICMD1 (S150). Thereafter, the first function block 235 transmits the generated second internal command ICMD2 to the second function block 255 included in the third layer. At this time, operation S160 is performed by the first function block 235.

Referring to FIG. 16B, the method of operating the controller according to embodiments of the present disclosure includes fetching the request received from the host (S210), searching for the received request from the internal command cache (S220), determining whether the request is searched (S230), when the request is searched (S230: Yes), obtaining the internal command corresponding to the request from the internal command cache (S240), when the request is not searched (S230: No), generating the internal command corresponding to the request (S250), and transmitting the internal command to the corresponding lower layer (S260).

The method shown in FIG. 16B is substantially the same as the method shown in FIG. 16A except that the request from the host device, rather than the first internal command is searched from an internal command cache. Therefore, an overlapping description is omitted.

Figure 17:
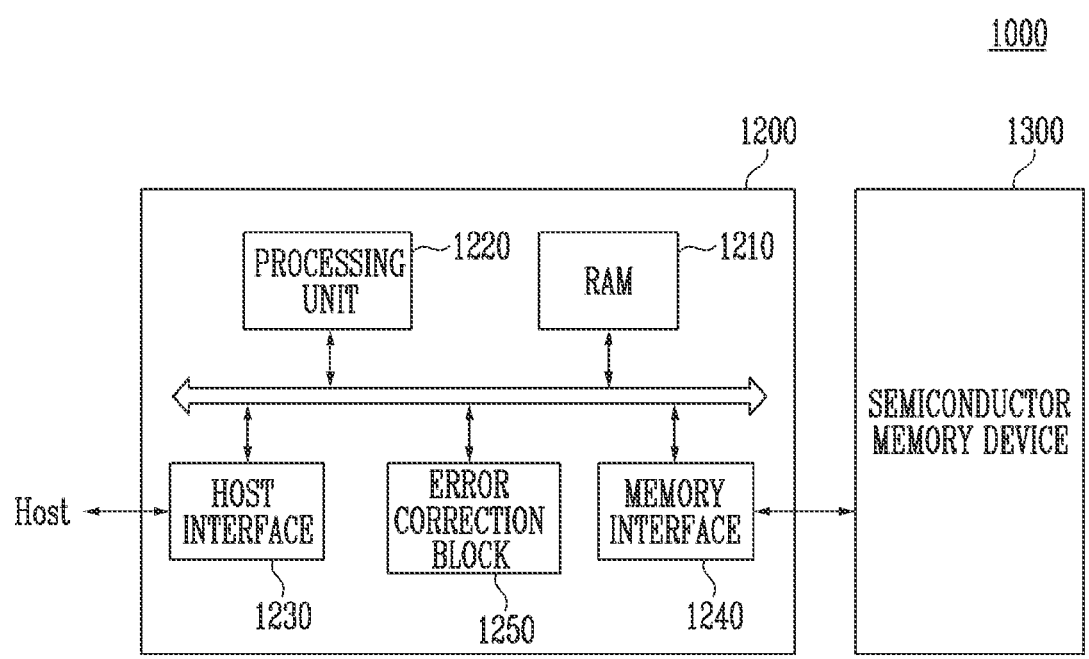
FIG. 17 is a block diagram illustrating a storage device including a semiconductor memory device and a controller according to an embodiment of the present disclosure.

FIG. 17 is a block diagram illustrating a storage device 1000 including a semiconductor memory device and a controller according to an embodiment of the present disclosure.

The semiconductor memory device 1300 of FIG. 17 may be configured and may operate similarly to the semiconductor memory device 100 described with reference to FIG. 2. Hereinafter, an overlapping description is omitted.

The controller 1200 is connected to a host device Host and the semiconductor memory device 1300. The controller 1200 is configured to access the semiconductor memory device 1300 in response to a request from the host device Host. For example, the controller 1200 is configured to control read, program, erase, and background operations of the semiconductor memory device 1300. The controller 1200 is configured to provide an interface between the semiconductor memory device 1300 and the host device Host. The controller 1200 is configured to drive firmware for controlling the semiconductor memory device 1300.

The controller 1200 includes a random access memory (RAM) 1210, a processing unit 1220, a host interface 1230, a memory interface 1240, and an error correction block 1250.

The RAM 1210 is used as one of an operation memory of the processing unit 1220, a cache memory between the semiconductor memory device 1300 and the host device Host, and a buffer memory between the semiconductor memory device 1300 and the host device Host.

The processing unit 1220 controls an overall operation of the controller 1200. The processing unit 1220 is configured to control the read program, erase, and background operations of the semiconductor memory device 1300. The processing unit 1220 is configured to drive firmware for controlling the semiconductor memory device 1300. The processing unit 1220 may perform a function of a flash translation layer (FTL). The processing unit 1220 may convert a logical block address (LBA) provided by the host device into a physical block address (PBA) through the FTL. The FTL may receive the logical block address (LBA) and convert the LBA into the PBA by using a mapping table. There are several address mapping methods of the FTL according to a mapping unit. A representative address mapping method includes a page mapping method, a block mapping method, and a hybrid mapping method.

The host interface 1230 includes a protocol for performing data exchange between the host device Host and the controller 1200. In an embodiment, the controller 1200 is configured to communicate with the host device Host through at least one of various communication standards or interfaces such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer system interface (SCSI) protocol, an enhanced small disk interface (ESDI) protocol, an integrated drive electronics (IDE) protocol, and a private protocol.

The memory interface 1240 interfaces with the semiconductor memory device 1300. For example, the memory interface 1240 includes a NAND interface or a NOR interface.

The error correction block 1250 is configured to detect and correct an error of data received from the semiconductor memory device 1300 using an error correcting code (ECC). The error correction block 1250 may correct an error by using the ECC on read page data. The error correction block 1250 may correct an error by using a coded modulation such as a low density parity check (LDPC) code, a Bose-Chaudhuri-Hocquenghem (BCH) code, a turbo code, a Reed-Solomon code, a convolution code, a recursive systematic code (RSC), a trellis-coded modulation (TCM), a block coded modulation (BCM), and a hamming code.

During a read operation, the error correction block 1250 may correct an error of the read page data. Decoding may be failed when the read page data includes error bits that exceed a correctable number of bits. The decoding may be successful when the page data includes error bits equal to or less than the correctable number of bits. The success of the decoding indicates that a read command is passed. The failure of the decoding indicates that the read command is failed. When the decoding is successful, the controller 1200 outputs the page data in which the error is corrected to the host device Host.

The controller 1200 and the semiconductor memory device 1300 may be integrated into one semiconductor device. In an embodiment, the controller 1200 and the semiconductor memory device 1300 may be integrated into one semiconductor device to configure a memory card. For example, the controller 1200 and the semiconductor memory device 1300 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, or MMCmicro), an SD card (SD, miniSD, microSD, or SDHC), and a universal flash storage (UFS).

The controller 1200 and the semiconductor memory device 1300 may be integrated into one semiconductor device to configure a semiconductor drive (solid state drive (SSD)). The semiconductor drive (SSD) includes a storage device configured to store data in the semiconductor memory. When the storage device is used as the semiconductor drive (SSD), an operation speed of the host device Host connected to the storage device is dramatically improved.

As another example, the storage device 1000 is provided as one of various components of an electronic device such as a computer, an ultra-mobile PC (UMPC), a workstation, a net-book, a personal digital assistants (PDA), a portable computer, a web tablet, a wireless phone, a mobile phone, a smart phone, an e-book, a portable multimedia player (PMP), a portable game machine, a navigation device, a black box, a digital camera, a 3-dimensional television, a digital audio recorder, a digital audio player, a digital picture recorder, a digital picture player, a digital video recorder, a digital video player, a device capable of transmitting and receiving information in a wireless environment, one of various electronic devices configuring a home network, one of various electronic devices configuring a computer network, one of various electronic devices configuring a telematics network, an RFID device, or one of various components configuring a computing system.

In an embodiment, the semiconductor memory device 1300 or the storage device may be mounted as a package of various types. For example, the semiconductor memory device 1300 or the storage device may be packaged and mounted in a method such as a package on package (POP), ball grid arrays (BGAs), chip scale packages (CSPs), plastic leaded chip carriers (PLCC), a plastic dual in line package (PDIP), a die in waffle pack, die in wafer form, a chip on board (COB), a ceramic dual inline package (CERDIP), a metric quad flat pack (MQFP), a thin quad flat pack (TQFP), a small outline integrated circuit (SOIC) package, a shrink small outline package (SSOP), a thin small outline package (TSOP), a system in package (SIP), a multi-chip package (MCP), a wafer-level fabricated package (WFP), or a wafer-level processed stack package (WSP).

Furthermore, the embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A controller controlling an operation of a semiconductor memory device based on a request received from a host, the controller comprising:
    a host interface configured to generate a first internal command in response to the request;
    a first function block configured to generate a second internal command in response to the first internal command;
    a second function block configured to operate in response to the second internal command; and
    an internal command cache configured to cache at least one internal command corresponding to a reference internal command,
    wherein when the second internal command corresponding to the first internal command is not cached in the internal command cache, the first function block generates the second internal command, and transmits the generated second internal command to the second function block.

2. The controller of claim 1, wherein the internal command cache is further configured to transmit, when the second internal command corresponding to the first internal command is cached in the internal command cache, the second internal command to the second function block.

3. The controller of claim 2, wherein when the second internal command corresponding to the first internal command is cached in the internal command cache, the first function block is configured so as not to generate the second internal command.

4. The controller of claim 1, further comprising a memory interface configured to communicate with the semiconductor memory device.

5. A controller controlling an operation of a semiconductor memory device based on a request received from a host, the controller comprising:
    a host interface configured to generate a first internal command in response to the request;
    a first function block configured to generate a second internal command in response to the first internal command;
    an internal command cache configured to cache at least one internal command corresponding to a reference request; and
    a second function block configured to operate in response to the second internal command,
    wherein when the second internal command corresponding to the request is not cached in the internal command cache, the first function block generates the second internal command, and transmits the generated second internal command to the second function block.

6. The controller of claim 5, wherein the internal command cache is further configured to transmit, when the first internal command corresponding to the request is cached in the internal command cache, the first internal command to the first function block.

7. The controller of claim 6, wherein when the first internal command corresponding to the request is cached in the internal command cache, the host interface is configured not to generate the first internal command.

8. The controller of claim 5, wherein when the first internal command corresponding to the request is not cached in the internal command cache, the host interface generates the first internal command, and transmits the generated first internal command to the first function block.

9. The controller of claim 5,
    wherein the internal command cache is further configured to transmit, when the second internal command corresponding to the request is cached in the internal command cache, the second internal command to the second function block.

* * * * *